US008361401B2

(12) United States Patent
Fridman et al.

(10) Patent No.: US 8,361,401 B2
(45) Date of Patent: Jan. 29, 2013

(54) VORTEX REACTOR AND METHOD OF USING IT

(75) Inventors: Alexander Fridman, Marlton, NJ (US);
Alexander F. Gutsol, Malvern, PA (US);
Young I. Cho, Marlton, NJ (US);
Lawrence Kennedy, Dublin, OH (US);
Alexei Saveliev, Chicago, IL (US);
Andrey Romanets, Morshansk (RU);
Igor Martveev, Falls Church, VA (US);
Kenneth Blank, Philadelphia, PA (US)

(73) Assignees: Drexel University, Philadelphia, PA (US); Board Of Trustees Of The University Of Illinois, Urbana, IL (US)

( * ) Notice: Subject to any disclaimer, the term of this patent is extended or adjusted under 35 U.S.C. 154(b) by 0 days.

(21) Appl. No.: 13/314,562

(22) Filed: Dec. 8, 2011

(65) Prior Publication Data

US 2012/0141332 A1      Jun. 7, 2012

Related U.S. Application Data

(62) Division of application No. 10/560,537, filed as application No. PCT/US2004/019590 on Jun. 18, 2004, now Pat. No. 8,110,155.

(60) Provisional application No. 60/551,725, filed on Mar. 10, 2004, provisional application No. 60/480,341, filed on Jun. 20, 2003.

(51) Int. Cl.
    *B01J 19/08* (2006.01)
(52) U.S. Cl. ............... 422/186.04; 422/186.21
(58) Field of Classification Search ............. 422/186.04, 422/186.21
See application file for complete search history.

(56) References Cited

U.S. PATENT DOCUMENTS

| 3,042,830 | A | | 7/1962 | Orbach |
| 3,344,051 | A | | 9/1967 | Latham, Jr. |
| 4,217,132 | A | | 8/1980 | Burge et al. |
| 4,690,743 | A | | 9/1987 | Ethington et al. |
| 4,801,435 | A | | 1/1989 | Tylko |
| 4,851,722 | A | | 7/1989 | Zauderer |
| 4,927,298 | A | | 5/1990 | Tuszko et al. |
| 4,995,231 | A | * | 2/1991 | Smith et al. ............ 60/203.1 |
| 4,995,805 | A | | 2/1991 | Hilliard |
| 5,116,488 | A | | 5/1992 | Torregrossa |
| 5,374,802 | A | | 12/1994 | Dorfman et al. |
| 5,425,332 | A | | 6/1995 | Rabinovich et al. |
| 5,437,250 | A | | 8/1995 | Rabinovich et al. |
| 5,486,269 | A | | 1/1996 | Nilsson |
| 5,847,353 | A | | 12/1998 | Titus et al. |
| 5,887,554 | A | | 3/1999 | Cohn et al. |
| 5,993,761 | A | | 11/1999 | Czernichowski et al. |
| 6,007,742 | A | | 12/1999 | Czernichowski et al. |
| 6,245,309 | B1 | | 6/2001 | Etievant et al. |
| 6,322,757 | B1 | | 11/2001 | Cohn et al. |
| 6,363,716 | B1 | | 4/2002 | Balko et al. |
| 6,396,213 | B1 | | 5/2002 | Koloc |
| 6,793,898 | B2 | * | 9/2004 | Brown et al. ............ 422/186.21 |
| 7,622,693 | B2 | | 11/2009 | Foret |
| 7,867,457 | B2 | | 1/2011 | Gutsol et al. |

FOREIGN PATENT DOCUMENTS

| WO | WO 2004/112950 | 12/2004 |
| WO | WO 2005/004556 | 1/2005 |

* cited by examiner

*Primary Examiner* — Kishor Mayekar
(74) *Attorney, Agent, or Firm* — Woodcock Washburn, LLP

(57) ABSTRACT

A vortex reactor is provided. The vortex reactor includes a substantially cylindrical shaped portion forming a reaction chamber therein, wherein said substantially cylindrical shaped portion forms a first charged electrode; a circumferential flow apparatus fluidly connected to the reaction chamber for creating a circumferential fluid flow; a second charged electrode; and an outlet for releasing said circumferential fluid flow. Also provided are methods of processing particulate solids using the vortex reactor of the invention.

15 Claims, 6 Drawing Sheets

VORTEX REACTOR AND METHOD OF USING IT

CROSS REFERENCE TO RELATED APPLICATIONS

This application is a divisional of U.S. patent application Ser. No. 10/560,537, filed Feb. 28, 2007, now U.S. Pat. No. 8,110,155, which is a National Stage Entry of PCT/US04/19590, filed Jun. 18, 2004, which claims priority to U.S. Patent Application Ser. Nos. 60/551,725, filed Mar. 10, 2004, and 60/480,341, filed Jun. 20, 2003, each of which is incorporated by reference in its entirety herein.

BACKGROUND

1. Field of the Invention

The present invention relates to plasma generators and their applications in plasma chemistry and technology. In particular, to the provision of a method of using a fluidized bed with low-temperature plasma without the use of a grid, the improvement of the efficiency and lifetime of reactors, and the design of electrodes in a Tornado Sliding Arc Plasma Generator (TSAPG).

2. Description of the Related Technology

Improving the efficiency of the operation of a fluidized bed remains an important technological goal, owing to the significant economic benefits that result in almost every sector of the economy.

Physical processes that utilize fluidized beds include drying, mixing, granulation, coating, heating and cooling. All these processes take advantage of the excellent mixing capabilities of the fluidized bed. Good solids mixing gives rise to good heat transfer, temperature uniformity and ease of process control. One of the most important applications of the fluidized bed is to the drying of solids. Fluidized beds are currently used commercially for drying such materials as crushed minerals, sand, polymers, pharmaceuticals, fertilizers and crystalline products.

Fluidized beds are often used to cool particulate solids following a reaction. Cooling may be by fluidizing air alone or by the use of cooling water passing through tubes immersed in the bed.

Other examples of the application of fluidized bed technology to different kinds of chemical reaction are ethylene hydrogenation, sulfide ore roasting, combustion, and hydrocarbon cracking. Reasons for using fluidized beds are the substantially uniform temperature inside the bed, ease of solid handling, and good heat transfer that they provide.

A new approach to the production of Vinyl Acetate Monomer (VAM) is to use a fluidized-bed process in which gas phase reactants are contacted continuously over (small-sized) supported catalytic particles under fluidized conditions.

Fluidized beds are also used as sorters in the food processing industry. This technology uses a mobile field separation apparatus that has a dry fluidized bed system with sand as the fluidized medium. The technology can remove all dirt clumps from the lifted product stream, such as from potatoes. The technology could be applied to cleaning field tare from incoming raw food product streams and could be used by industrial processors to replace water flumes that consume significant electrical power and water and require a relatively high degree of maintenance.

Fluidized beds can also be used in gasification systems. The fluid bed converts, for example, biomass waste products into a combustible gas that can be fired in a boiler, kiln, gas turbine or other similar device as a means to convert a portion of the fuel supply to clean, renewable biomass fuel. Gasification is the thermal decomposition of organic matter in an oxygen deficient atmosphere producing a gas composition containing combustible gases, liquids and tars, charcoal, and air, or inert fluidizing gases. Typically, the term "gasification" refers to the production of gaseous components.

A gas distributor is a device designed to ensure that the fluidizing gas is always substantially evenly distributed across the cross-section of the bed. It is an important part of the design of a fluidized bed system. Good design is based on achieving a pressure drop, which is a sufficient fraction of the bed pressure drop. Some distributor designs in common use are (a) drilled plate, (b) cap design, (c) continuous horizontal slots, (d) stand pipe design, and (e) sparge tubes with holes pointing downwards.

Loss of fluidizing gas will lead to collapse of the fluidized bed into a packed bed. If the process involves the generation of heat, then this heat will not be dissipated as well from the packed bed as it was from the fluidized bed.

All parts of the fluidized bed unit are subject to erosion by the solid particles. Heat transfer tubes within the bed or freeboard are particularly at risk and erosion here may lead to tube failure. Erosion of the distributor may lead to poor fluidization and areas of the bed becoming de-aerated. Loss of fine solids from the bed reduces the quality of fluidization and reduces the area of contact between the solids and the gas in the process. In a catalytic process this generally results in lower conversion.

In addition, reactors employing a grid for the generation of plasma are also subject to erosion by contact with solid particulates. Also, generation of plasma using a grid is less energy efficient than other methods of plasma generation.

In a fluidized bed combustion chamber, known as a spouted bed reactor, a cone shaped hopper is continuously fed with solid particles. The solid particles are suspended briefly and processed in an axial flow of gas originating from the bottom or apex of the cone. One disadvantage of the spouted bed reactor is the instability of the axial gas flow. The solid particles fall out of suspension easily due to turbulence and accumulate in the narrower bottom portion of the cone. In addition, the bottom entry tube provides only an axial gas flow velocity component. Thus, there is no orthogonal gas flow velocity component to assist in distributing the solid particles throughout the cone shaped reactor. Consequently, the mixing of solid particles with gas, and the interaction among the solid particles, are relatively poor. The poor mixing and non-uniform particle distribution result in a relatively low efficiency of combustion and/or gasification.

In order to improve the distribution of solid particulates throughout a cone shaped reactor and, thereby, minimize inefficiencies produced by non-ideal particle distributions, it is known to utilize a circumferential flow of gas whose direction is orthogonal to the axial gas flow. The axial and circumferential gas flows may preferably be adjusted to produce a vortex in the conical reactor.

U.S. Pat. No. 5,486,269, for example, describes an inverted conical reactor, suitable for coal gasification, which uses a tangential flow of air to achieve a vortex flow pattern.

None of these devices and methods, however, provides fluidization of solid particulates with optional plasma energy input and without employing a grid. Therefore, there remains a need for a fluidization reactor with optional plasma energy input that does not employ a grid.

Another application of plasma technology is thermal spray deposition. A plasma jet generated by a plasma generator accelerates and melts particles of the material to be deposited on the substrate. This technology is widely used for the development of hard, corrosion-resistant, thermal barriers and other types of coatings. DC plasma torches used in such plasma generators have a very limited lifetime because of electrode erosion.

Another application of plasma technology is thermal waste destruction. In this case plasma generators are used as sources of high temperature and/or chemically active plasma for waste treatment. Also, in some cases plasma generators are used as reactors for waste destruction. In all these cases, use of cheap and effective DC or AC plasma generators with open (non-insulated) electrodes is limited by the very limited lifetime of the electrodes.

Other applications of plasma technology include different plasma chemical processes (decomposition of chemical solutions, oxidation and reduction of different metals, production of nano-particles, surface treatment and sterilization, and so on), welding, cutting, etc. In all cases of plasma technology application the key problem related to the use of cheap and effective DC and AC plasma generators and plasma reactors, is the limited lifetime of the electrodes.

Additionally, reverse vortex (tornado) sliding (or gliding) arc plasma generators (TSAPG) with electrodes for DC or AC current have been recently developed. Electrodes for TSAPG in current use have complex shapes (spiral or ring). These electrodes are typically submerged in the plasma generator volume, which results in gas flow disturbance and electrode overheating. Despite the recent development of these generators, the problems with the overall lifetime of the plasma generators and the efficiency of the energy use have not been completely solved. An optimal electrode design has not yet been developed.

Additionally, flame stabilization of lean and super lean fuel and air mixtures for NOx reduction is a key problem for modern gas turbine engines and burners. One of the well-known solutions is utilization of pilot flames, but existing pilot flames generate too much nitrogen oxide. Utilization of a DC plasma torch for flame stabilization in gas turbine engines works well in the combustion process, but its application is restricted by the limited life cycle of the plasma generator electrodes. The electrode design should ensure reliable ignition of the arc, long lifetime of the electrodes and absence of significant disturbances of the reverse vortex flow.

Therefore, there remains a need for an electrode design that provides an extended lifetime of the electrodes and increases the energy efficiency of the system.

SUMMARY OF THE INVENTION

Accordingly, it is an object of certain embodiments of the invention to provide a fluidization reactor with optional plasma energy input that does not employ a grid.

In order to achieve the above and other objects of the invention, a vortex reactor is provided. In one aspect of the invention, the vortex reactor has a reaction chamber including a substantially frustum-shaped portion. The narrower part of the frustrum-shaped portion is downwardly oriented. The vortex reactor is further equipped with a device for creating an axial gas flow, and a device for creating a circumferential gas flow. Also included is a solid particle inlet for introducing particulate solids into the reactor.

In another aspect of the invention, a method for plasma-assisted processing of a solid particulate is provided. In this method, a vortex reactor is provided which includes a substantially frustum-shaped portion. The reactor is provided with a circumferential gas flow and, optionally, with an axial gas flow. Solid particles are added to the reactor, and the particles are processed by reaction with at least one of the gases. Optionally, generating plasma in at least a portion of the reaction mixture may assist the treatment of solid particulates.

A third aspect of the invention discloses a vortex reactor that has a substantially cylindrical shaped portion forming a reaction chamber therein. The substantially cylindrical shaped portion forms a first charged electrode. An axial flow apparatus is fluidly connected to the reaction chamber for creating an axial fluid flow in the reaction chamber. A circumferential flow apparatus is fluidly connected to the reaction chamber for creating a circumferential fluid flow.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENTS

Several patents are referenced herein in order to illustrate the contents of the art. Each of these patents is incorporated by reference as if set forth fully herein.

In general, dimensions, sizes, tolerances, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, parameter, shape or other quantity or characteristic is "about" or "approximate" as used herein, whether or not expressly stated to be such.

Figure 1:
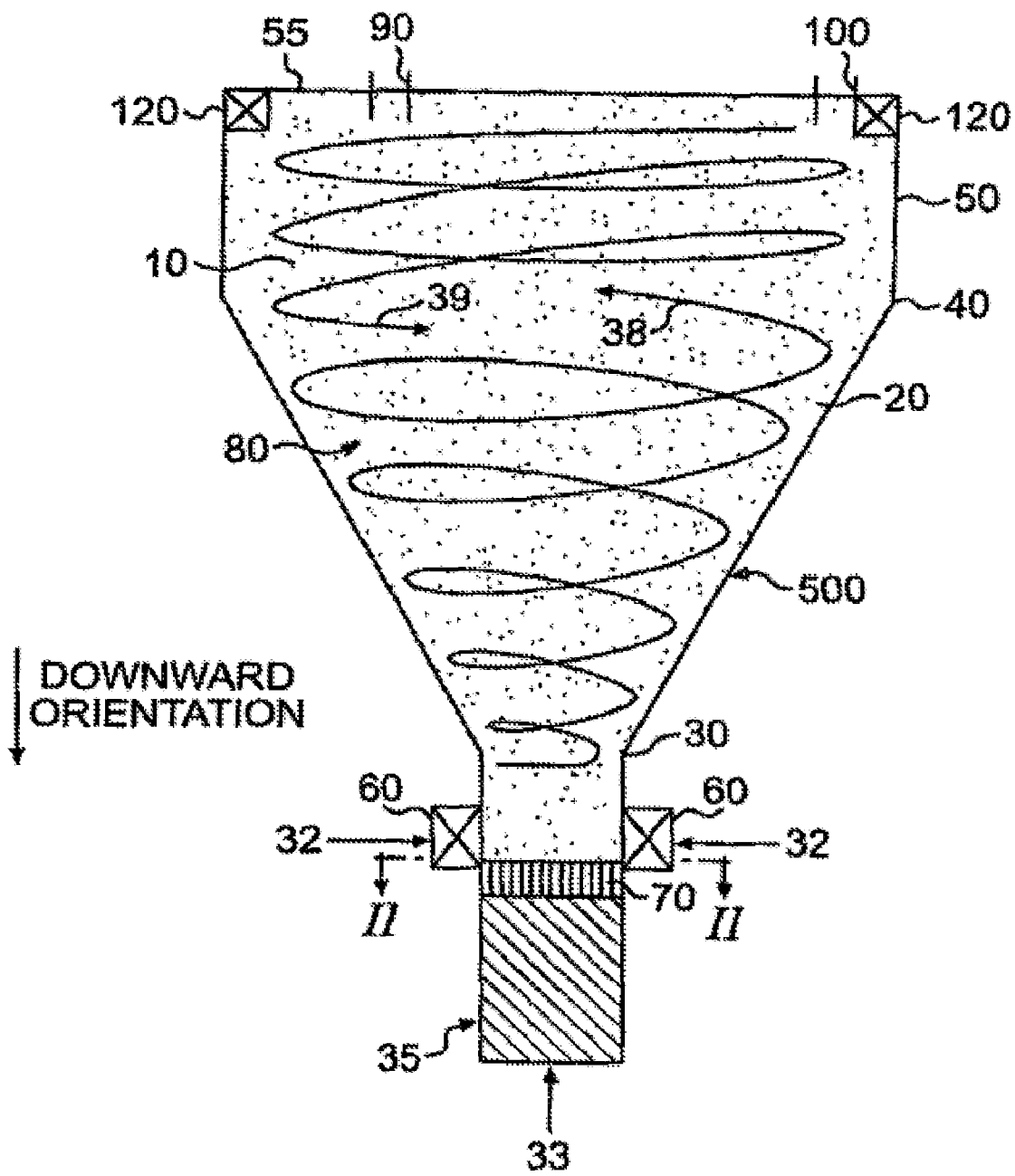
FIG. 1 is a cross-sectional view of one embodiment of a vortex spouted bed reactor.

Referring now to the drawings, wherein like reference numerals designate corresponding structure throughout the views, and referring in particular to FIG. 1, an embodiment of a vortex spouted bed reactor 500 of the present invention is depicted. Vortex spouted bed reactor 500 includes a reaction chamber 10 formed by a hollow frustum-shaped portion 20. Narrower part 30 of the frustum-shaped portion 20 is downwardly oriented. A bottom entry tube 35 connects to narrower part 30. Frustum-shaped portion 20 has a top portion 40, to which a reaction chamber extension 50 is optionally attached. Vortex spouted bed reactor 500 may optionally include a cap 55. At or near the top of vortex spouted bed reactor 500, there is a particle feeder 90, for introducing solid particles 80 into reaction chamber 10. An outlet 100 for ash and exhaust gas is also positioned at or near the top of vortex spouted bed reactor 500. One or more additional vortex flow nozzles 120 may also be located within reaction chamber 10.

In the embodiment shown in FIG. 1, a circumferential gas flow in reaction chamber 10 is produced by introducing a tangential gas flow 65 tangential to the walls of bottom entry tube 35 and frustum-shaped portion 20. Tangential gas flow 65 is created by gas flow 32 entering reaction chamber 10 through one or more nozzles 60 located proximate to narrower part 30 of frustum-shaped portion 20. The circumferential gas flow produced in reaction chamber 10 becomes a vortex gas flow 38 when combined with an axial flow of gas 33 from bottom entry tube 35, which flows through porous bed 70. Vortex gas flow 38 is characterized by an intense swirl or spiral flow with a relatively strong circumferential component. Solid particles 80 can thus be spread throughout reaction chamber 10 and over the sidewalls of frustum-shaped portion 20. Porous bed 70 located at or near narrower part 30 also functions to retain solid particles 80 in reactor 500, should they fall from the vortex gas flow 38. Axial gas flow 33 can also help to recirculate fallen solid particles 80 in reaction chamber 10, thus improving particle interaction, the uniformity of particle distribution, and reactor efficiency.

Reverse vortex flow nozzles 120 may advantageously be included in vortex spouted bed reactor 500. Reverse vortex flow nozzles 120 are preferably located proximate to the top of reactor 500. Reverse vortex flow nozzles 120 are positioned to create a reverse vortex flow 39 that moves in the same direction as vortex gas flow 38 generated by a combination of tangential gas flow 65 and axial gas flow 33. This reverse vortex flow 39 helps particles 80 to be recirculated within reaction chamber 10.

Furthermore, vortex spouted bed reactor 500 of the invention advantageously provides more effective interaction among solid particles 80, gas, and plasma during fluidization processes. This interaction includes a high degree of mixing among the gas and particles, thus increasing the yield of the chemical reactions. Processes conducted in reactor 500 are also characterized by increased effective diameter of gas, and and/or plasma in reaction chamber 10.

Suitable gases for use in the reactor of the present invention include, without limitation, air, oxygen, nitrogen, steam, hydrogen, lower hydrocarbons, or mixtures of one or more thereof, for example a mixture of steam and a lower hydrocarbon. In general, a gas is suitable for use in the reactor of the present invention if it comprises a reagent, participates in the fluidization, or if it is inert but can feasibly support a plasma or otherwise transfer energy to the reaction mixture.

Figure 2:
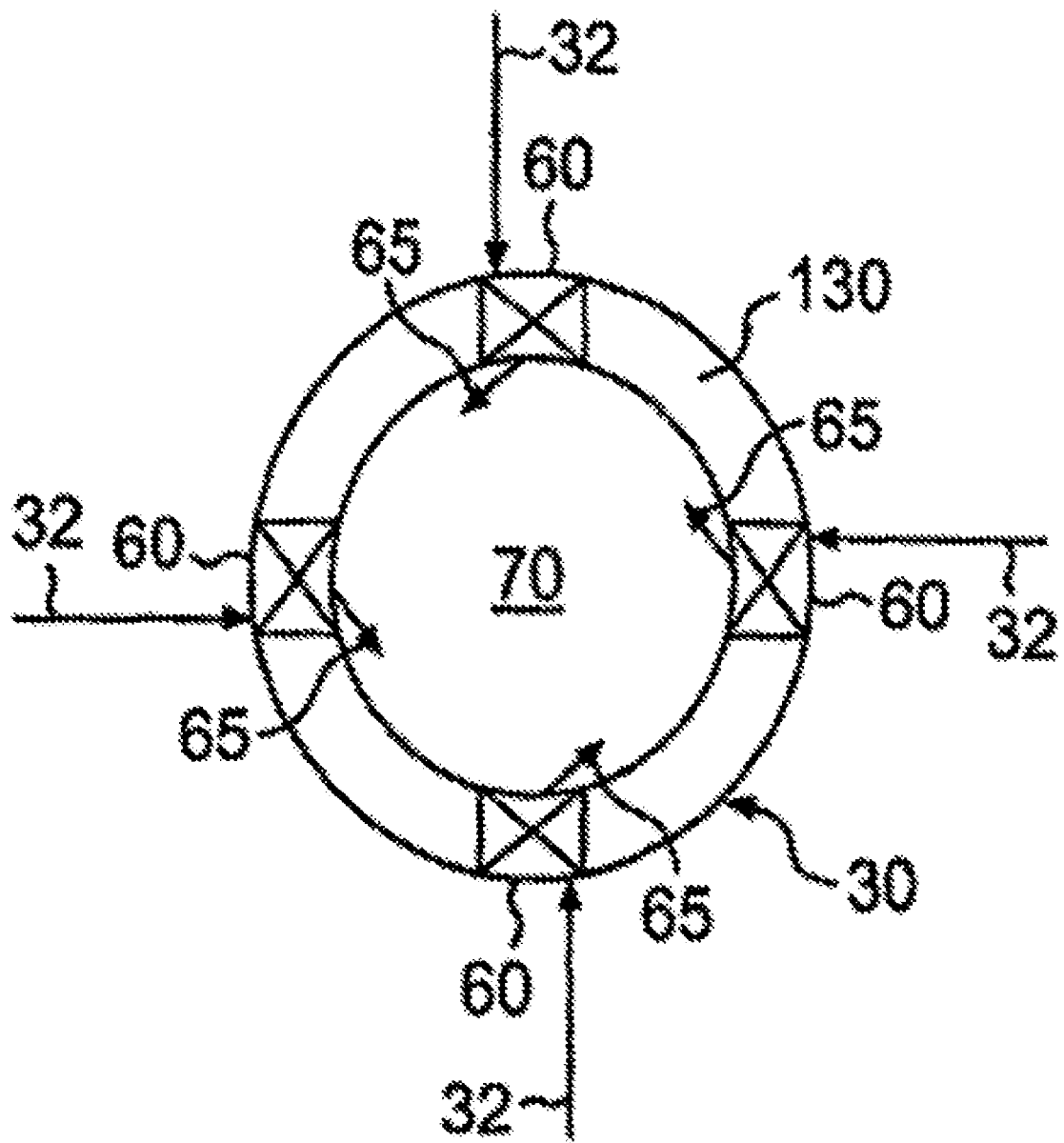
FIG. 2 is a cross-sectional view of a vortex spouted bed reactor taken along line II-II of FIG. 1, showing a nozzle arrangement.

FIG. 2 depicts a cross-sectional view of a multiple nozzle arrangement, wherein gas enters vortex spouted bed reactor 500 tangentially at 65 through four nozzles 60, thereby creating a gas flow tangential to the walls of bottom entry tube 35 that contributes to providing a vortex gas flow 38 in reaction chamber 10. Vortex gas flow 38 gradually moves upward in reaction chamber 10 with a strong circumferential velocity component. In order to evenly distribute the gas into multiple nozzles 60, a gas passage 130 may be used. The number of nozzles 60 employed in a particular reactor is preferably no more than 8, and more preferably, four nozzles 60 are employed.

The multiple nozzle arrangement shown here produces a swirl flow inside the reactor. Any other device that can generate the swirl flow inside the reactor can be used. For example, multiple vanes and a spiral shaped passage can also generate a swirl flow inside the reactor, Advantageously, porous bed 70 of vortex spouted bed reactor 500 shown in FIG. 1 may be replaced with a flow restrictor 150 that reduces the effective diameter of bottom entry tube 35 to help retain the solid particles 80 within reaction chamber 10, and permit sufficient axial gas flow 33 from bottom entry tube 35 to reaction chamber 10. For example, referring to FIG. 3, a flow restrictor 150, shown in vertical cross-section, is located in the center of bottom entry tube 35 of vortex reactor 600. In the embodiment shown in FIG. 3, flow restrictor 150 is bi-conical, and thus diamond-shaped, as viewed in a vertical cross-section. The base or horizontal cross-section of the widest portion of flow restrictor 150 is preferably circular when flow restrictor 150 is located in a circular bottom entry tube 35, to provide a uniform spacing at a given height between flow restrictor 150 and the wall of the bottom entry tube 35. Similarly, if the bottom entry tube 35 has a square cross-section, the horizontal cross-section of the widest portion of the flow restrictor 150 is preferably square to again maintain a substantially uniform size of the gap portion of 140 between flow restrictor 150 and the walls of bottom entry tube 35. Flow restrictor 150 may also be located in reaction chamber 10, or partially in reaction chamber 10 and partially in bottom entry tube 35.

Still referring to FIG. 3, multiple nozzles 60 may be positioned such that vortex gas flow 38 is created below gap 140 for improved acceleration of the gas. Improved acceleration of the gas is obtained by forcing the gas of the vortex gas flow 38 to pass through the relatively narrow portion of gap 140 between flow restrictor 150 and the walls of bottom entry tube 35, thereby accelerating the gas.

Flow restrictor 150 may have any shape that is suitable for reducing the effective diameter of bottom entry tube 35, while permitting at least axial gas flow 33 past or through flow restrictor 150. Many such objects are conventional in the field of fluid mechanics, including, without limitation, conical and bi-conical objects that create Venturi flow; spheres; and truncated bi-conical objects that are trapezoidal, as viewed in a vertical cross-section.

Non-equilibrium low-temperature plasma reactions are a highly efficient method for processing solid particles. Accordingly, FIG. 3 presents an embodiment of a vortex reactor 600 in which vortex reactor 600 is equipped to generate plasma to assist in improving fluidized bed processing. Flow restrictor 150 functions as a first electrode, and the sidewall of the frustum-shaped portion 20 functions as a second electrode. Voltage is applied from an external source, not shown, to the first and second electrodes to create a voltage difference between the first and second electrodes. A sufficient voltage difference between the first and second electrodes will cause a gliding electrical arc 170 to span the distance between the first and second electrodes. Gas that comes in contact with the gliding electrical arc 170 may become ionized to form plasma. It is well understood that the voltage difference required to generate the arc will depend on the distance between the first and second electrodes, and on the concentration and nature of the matter in the reaction chamber 10.

Preferably, for better performance, vortex reactor 600 is designed to provide a gliding electrical arc 170 in the reaction chamber 10. For this purpose, the flow restrictor 150, which functions as the first electrode, can be extended using a straight rod 160 in order to spread the gliding electrical arc 170 upward as well as along the circumferential direction through reaction chamber 10 as shown in FIG. 3. In this manner, a gliding electrical arc can be created in reaction chamber 10.

In general, the provision of a narrow portion of gap 140 between flow restrictor 150, acting as the first electrode, and the sidewalls of the bottom entry tube 35 or frustum-shaped portion 20 to initiate gliding electrical arc 170, combined with a gradual increase in the size of gap 140 between the first and second electrodes, is required to provide the desired gliding electrical arc 170. Accordingly, flow restrictors of any suitable geometry and size can be employed as the first electrode to provide the desired gliding arc, as long as they provide the narrow portion of gap 140 and a gradual increase in the size of the gap 140.

Figure 3:
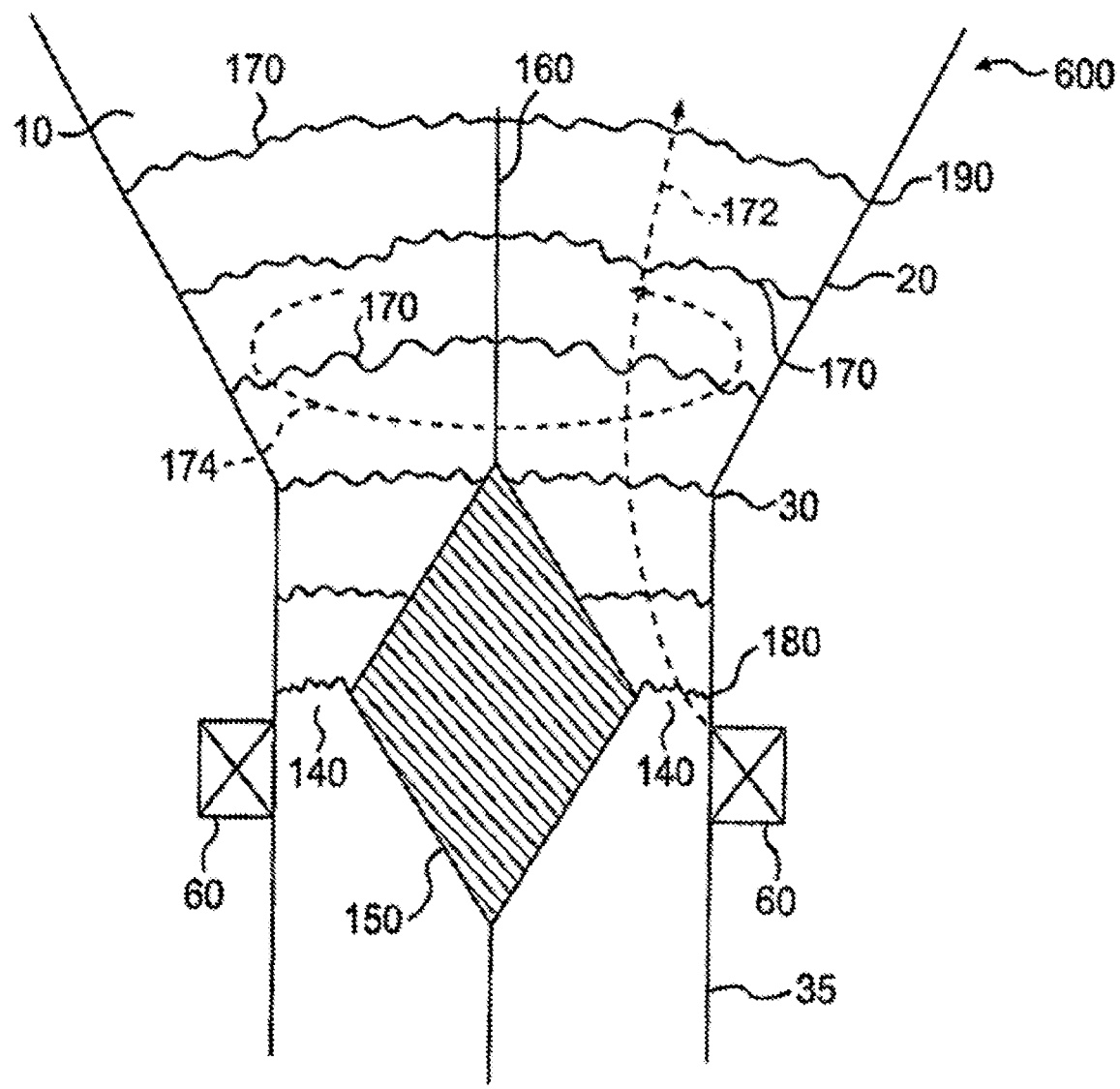
FIG. 3 is a cross-sectional view of another embodiment of a vortex reactor equipped for plasma generation.

FIG. 3 also depicts initiation point 180 and termination point 190 of a gliding electrical arc that is produced between the first and second electrodes when vortex reactor 600 is optionally equipped for plasma generation. A portion of gap 140 is made small, for example, about 3 mm, so that a gliding electrical arc 170 can be initiated at initiation point 180 with a voltage of about 10 kV DC power. The distance between the first and second electrodes should increase gradually so that the gliding electrical arc 170 can glide upwardly in reaction chamber 10 to cover at least a substantial portion of reaction chamber 10, and more preferably all of reaction chamber 10. As a result of the distance between the first and second electrodes increasing, gliding electrical arc 170 eventually terminates at a termination point 190 when the distance becomes too great for gliding electrical arc 170 to cross the gap between the first and second electrodes. In this manner, a low-temperature, non-equilibrium plasma reaction can be created in the reaction chamber 10. This provides an efficient processing method for solid particles.

Figure 4:
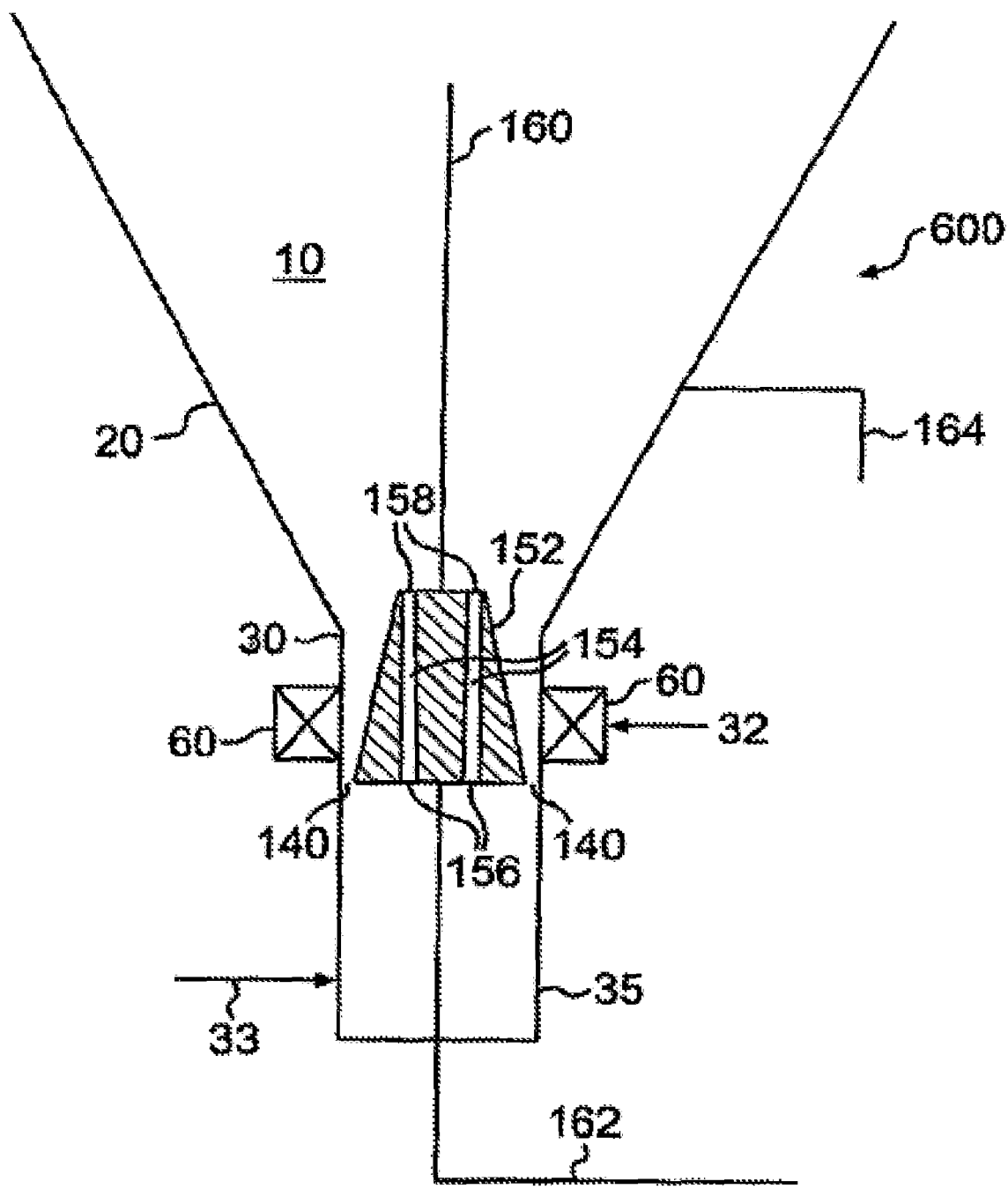
FIG. 4 is a cross-sectional view of a yet another embodiment of a vortex reactor equipped for plasma generation.

Referring to FIG. 4, there is shown another alternative embodiment of a vortex reactor 600 wherein flow restrictor 152 includes one or more channels 154 in flow restrictor 152. Each channel is preferably oriented in a substantially axial direction, relative to bottom entry tube 35, as shown in FIG. 4. Channels 154 may be used to increase axial and/or circumferential gas flow, or to alter the ratio of axial to circumferential flow. Channels 154 may have a substantially constant diameter or, in a more preferred embodiment as shown in FIG. 4, channels 154 may taper in the axial direction from a larger diameter at the inlet side 156 of channels 154 to a smaller diameter at the outlet side 158 of the channels 154 to thereby provide additional acceleration of the gases flowing through channels 154.

Also shown in FIG. 4 is an electrical input 162 connected to flow restrictor 152 for applying a voltage to flow restrictor 152 for plasma generation. A similar electrical connection 164 is provided for applying a voltage to the wall of frustum-shaped portion 20, as shown. Flow restrictor 152 of FIG. 4 represents an alternative preferred flow restrictor, which has a trapezoidal shape, as viewed in a vertical cross-section. One advantage of trapezoidal flow restrictor 152 is that it can provide a very gradual widening of a portion of gap 140 between flow restrictor 152 and the walls of bottom entry tube 35 and frustum-shaped portion 20. Also, the entire vertical length of the trapezoidal flow restrictor 152 can be employed to gradually widen a portion of gap 140, whereas in the case of diamond-shaped flow restrictor 150 of FIG. 1, only half of the vertical length of flow restrictor 150 is employed to gradually widen gap 140.

Figure 5:
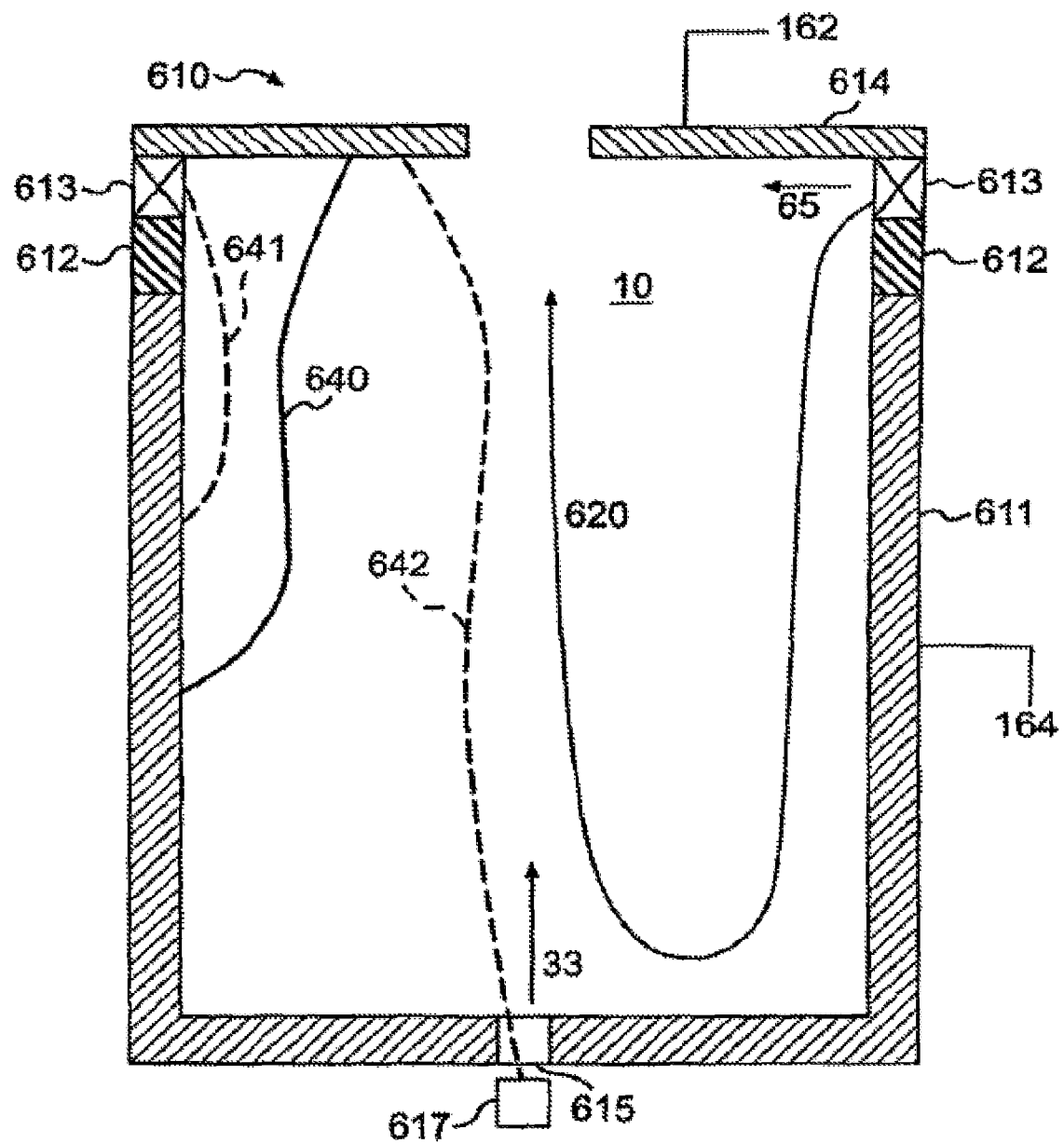
FIG. 5 is a cross-sectional view of a vortex reactor that is cylindrical in shape.

FIG. 5 will now be discussed in detail. FIG. 5 shows a cross-sectional view of a reactor 610. The reactor 610 has a negatively charged cylindrical electrode 611 that forms a portion of chamber 10. It is to be understood, that cylindrical electrode 611 could alternatively be positively charged when the nozzle plate 614 is negatively charged. Electrical input 164 is connected to cylindrical electrode 611 and provides voltage to the system.

Cylindrical electrode 611 has an optional bottom opening 615 located on a bottom portion for receiving an optional injection of an axial or vortex flow 33 of a second fluid (gas, liquid, disperse medium). An axial flow apparatus 617 can be comprised of gas nozzles, jets, or other equivalent devices to release fluid (a gas, liquid, or disperse medium) into chamber 10 and can be located in or near bottom opening 615. Axial flow apparatus 617 may additionally comprise a porous bed.

On a top portion of cylindrical electrode 611 there is provided an insulator 612. Insulator 612 is placed so that it provides insulation between negatively charged cylindrical electrode 611 and positively charged nozzle plate 614. Electrical input 162 is connected to nozzle plate 614 for providing a voltage to nozzle plate 614. The circumferential flow apparatus 613 provides a tangential flow 65 of a first fluid (gas, liquid, disperse medium) injection. Circumferential flow apparatus 613 can be comprised of nozzles, jets, special vortex chamber or a number of other coaxially installed equivalent devices to release fluid into chamber 10. Additionally a flow restrictor (not shown) may form part of circumferential flow apparatus 613 and may be used to adjust the flow of the first fluid into chamber 10. Tangential flow 65 creates a reverse vortex flow 620 in reactor 610.

Nozzle plate 614 is provided on the top portion of reactor 610. Nozzle plate 614 is used to control the output of reactor 610.

Several operations occur simultaneously within reactor 610 when in operation. A tangential flow 65 of the first fluid is injected via circumferential flow apparatus 613 into reaction chamber 10. The injection of tangential flow 65 creates a reverse vortex flow 620. This reverse vortex flow 620 initially comes down along the inside surface of cylindrical electrode 611 and mixes with optional axial or vortex flow 33 injected via opening 615 by axial flow apparatus 617. The mixing adds additional fluid to the reverse vortex flow 620. Then reverse vortex flow 620 turns upward to the nozzle plate 614 and to the output of the reactor. At this time, electric arc 640 burns between the inside surfaces of cylindrical electrode 611 and nozzle plate 614. The electric arc 640 is formed through the application of voltage to cylindrical electrode 611 via electrical input 164 and voltage supplied to nozzle plate 614 via electrical input 162. Nozzle plate 614 has an opposite charge from cylindrical electrode 611, which causes an electric arc 640 to form. The voltage applied between the two electrodes 611, 614 should be between 0.1 and 50 kV, preferably between 2 and 20 kV, and most preferably 3-10 kV. Due to the vortex, the electric arc 640 rotates throughout reaction chamber 10 and ionizes the fluid mixture. This heats up the mixture and/or starts plasma chemical process.

Optionally, circumferential flow apparatus 613 can be electrically connected to the nozzle plate 614 or can be charged via electrical input 162. In this case arc 641 can be formed between circumferential flow apparatus 613 and cylindrical electrode 611.

Optionally axial flow apparatus 617 can be electrically connected to the cylindrical electrode 611 or can be charged via electrical input 164. In this case the arc 642 can be formed between axial flow apparatus 617 and nozzle plate 614.

Figure 6:
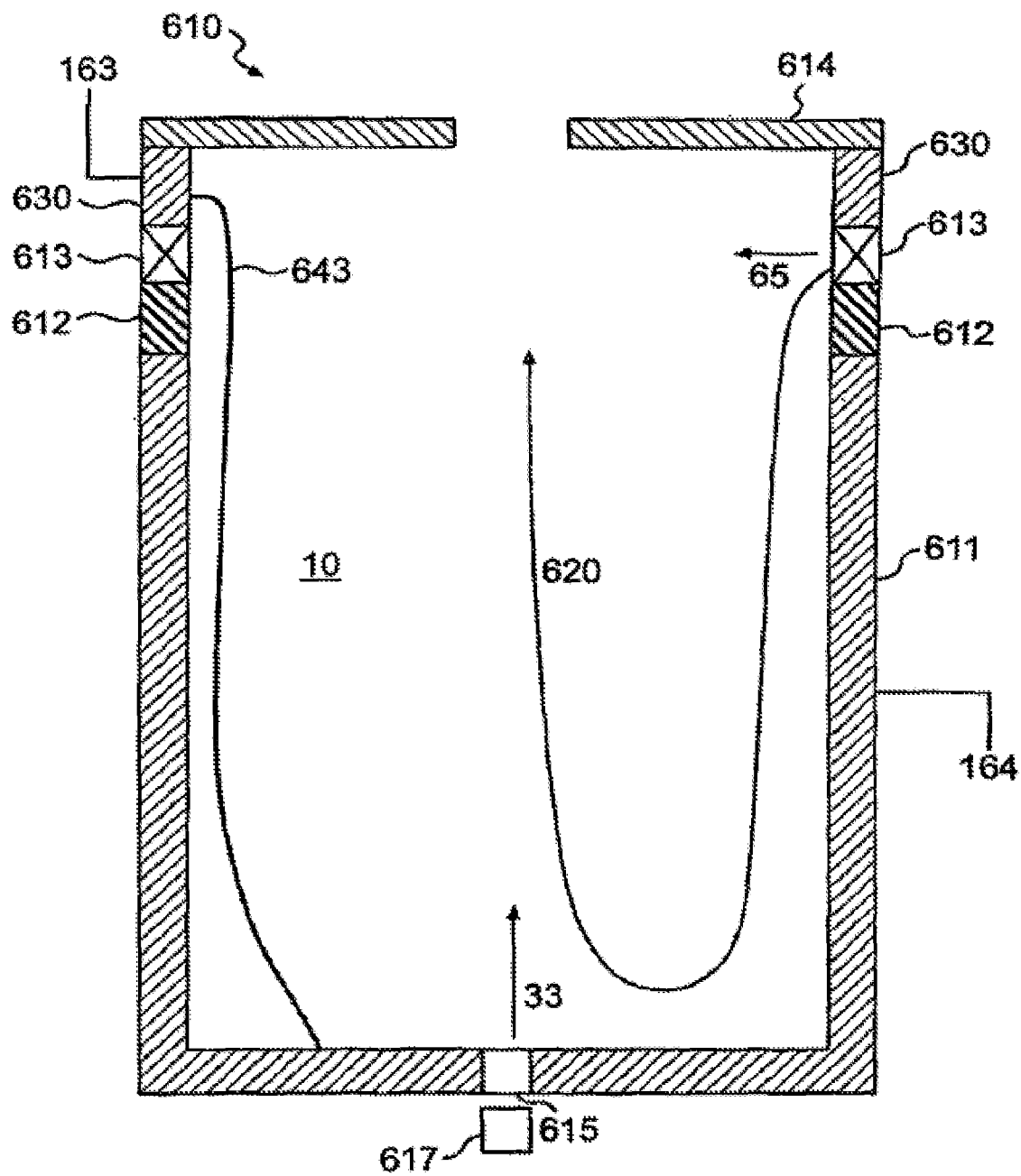
FIG. 6 is a cross-sectional view of another vortex reactor that is cylindrical in shape and has a plurality of electrodes.

Optionally, the reaction chamber 10 consists of different electrically disconnected parts including a cylindrical electrode 611 and an electrode 630. In this case arc 643 can be formed between cylindrical electrode 611 and electrode 630, as shown in FIG. 6. Electrode 630 can be charged via electrical input 163.

A vortex reactor (TSAPG) with a cylindrical electrode can be used for several different applications: thermal spray deposition chemical technology; waste treatment; metallurgy; plasma-assisted combustion devices; igniters and pilot flames for turbine engines, boilers, burners, furnaces, etc.

The electrode life cycle for almost all direct current (DC) or alternative current (AC) plasma reactors is now the main restriction on their application. The combination of a reverse vortex plasma reactor device (TGAPG) with a cylindrical electrode creates a device that has a wider range of operational parameters, a dramatically increased life cycle of the electrode, the ability to reduce electric arc power consumption, and reduced NOx formation in case of air as a working medium (the first fluid).

It is to be understood that various features of the different embodiments shown in the drawings may be combined with one another in a reverse vortex reactor (TGAPG) in accordance with the present invention.

Materials and specifications suitable for constructing a vortex reactor in accordance with the present invention are well known to those of skill in the art. The current strength should be less than 10000 Amps, preferably less than 100 Amps and most preferably less than 1 Amp. The cone angle of the frustum-shaped reactor, which is the angle between a vertical line and the wall of the inclined reactor, should be in a range of 5 to 45 degrees, when the frustum-shaped reactor is upright.

In a second aspect, the present invention relates to a method for the processing of solid particulates in a vortex reactor. The method includes the steps of introducing solid particles into said reaction chamber, subjecting said solid particles to a vortex gas flow created by a combination of a circumferential gas flow and an axial gas flow, and processing said solid particles by drying, mixing, coating, heating, peeling, or chemical reaction.

In the method, the steps of feeding gas may create the axial fluid flow in an axial direction into said reaction chamber and accelerating said axial gas flow through a flow restriction. The circumferential gas flow may be created by the step of feeding gas into said reaction chamber in a direction tangential to a sidewall of said reaction chamber, or alternatively, when the vortex reactor includes a bottom entry tube, by feeding gas into said bottom entry tube in a direction tangential to a sidewall of said bottom entry tube at a location below the flow restriction.

The method may further include the step of generating plasma in said reaction chamber. The step of generating plasma in said reaction chamber may include the step of providing a gliding electrical arc in said reaction chamber, as discussed above. A reverse vortex flow, as discussed above, may also be provided in the method of the present invention.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed:

1. A vortex reactor, comprising:
   a reaction chamber having a substantially cylindrical shaped wall and first and second ends, wherein said substantially cylindrical shaped wall is in electric communication with the first end, said wall and first end together forming a first charged electrode;
   a circumferential flow apparatus fluidly connected to the reaction chamber for creating a circumferential fluid flow;
   a second charged electrode either comprising or proximate to the second end; and
   an outlet for releasing said circumferential fluid flow through the second end;
   said reactor configured to provide a reverse vortex flow pattern in the reaction chamber.

2. The vortex reactor of claim 1, further comprising an axial flow inlet apparatus fluidly connected to said reaction chamber through said first end for creating an axial fluid flow in said reaction chamber.

3. The vortex reactor of claim 2, wherein said axial flow inlet apparatus comprises a gas supply and either a porous bed or a flow restrictor.

4. The vortex reactor of claim 1, wherein said circumferential fluid flow apparatus is proximate to said outlet.

5. The vortex reactor of claim 1, wherein said outlet comprises a nozzle plate located at the second end of said reaction chamber.

6. The vortex reactor of claim 5, wherein said second charged electrode forms a portion of said nozzle plate.

7. The vortex reactor of claim 1, further comprising an axial flow inlet apparatus fluidly connected to said reaction chamber for creating an axial or swirl fluid flow near an axis of said reaction chamber; and located at the first end of said cylindrical chamber.

8. The vortex reactor of claim 1, wherein an insulator is provided between said first charged electrode and said circumferential flow apparatus.

9. The vortex reactor of claim 1, wherein said apparatus for creating circumferential fluid flow comprises a gas supply and one or more gas inlet nozzles oriented tangentially relative to a sidewall of said cylindrical shaped portion.

10. The vortex reactor of claim 1, wherein said reactor further comprises an axial flow inlet apparatus fluidly connected to said reaction chamber, and said apparatus for creating circumferential fluid flow comprises a fluid supply and one or more fluid inlet nozzles oriented tangentially relative to a sidewall of a bottom entry tube.

11. The vortex reactor of claim 1, further comprising an apparatus for generating plasma.

12. The vortex reactor of claim 1, wherein said circumferential flow apparatus generates an axially-symmetric circumferential fluid flow.

13. The vortex reactor of claim 1, wherein said circumferential flow apparatus further comprises an electrical insulator.

14. The vortex reactor of claim 1, wherein said second charged electrode forms part of said circumferential flow apparatus and an electrical arc is formed between said first charged electrode and said second charged electrode.

15. The vortex reactor of claim 1, wherein said second charged electrode is formed at different portion of said substantially cylindrical shaped portion than said first charged electrode and an electrical arc is formed between said first charged electrode and said second charged electrode.

* * * * *